Sept. 22, 1931.  J. R. KOVAR ET AL  1,824,602
CULTIVATOR WITH THREE WHEELS
Filed June 7, 1928   3 Sheets-Sheet 2
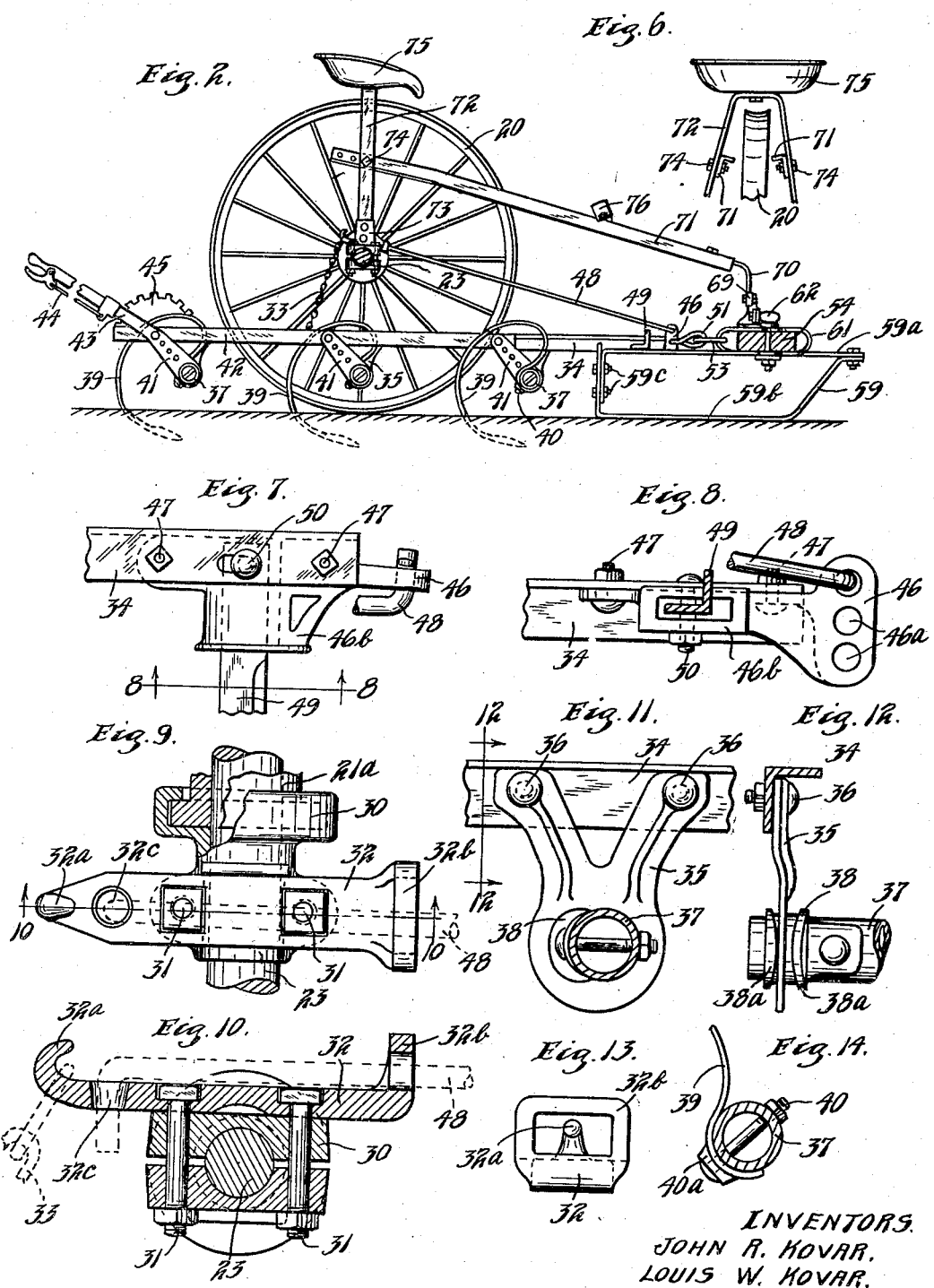

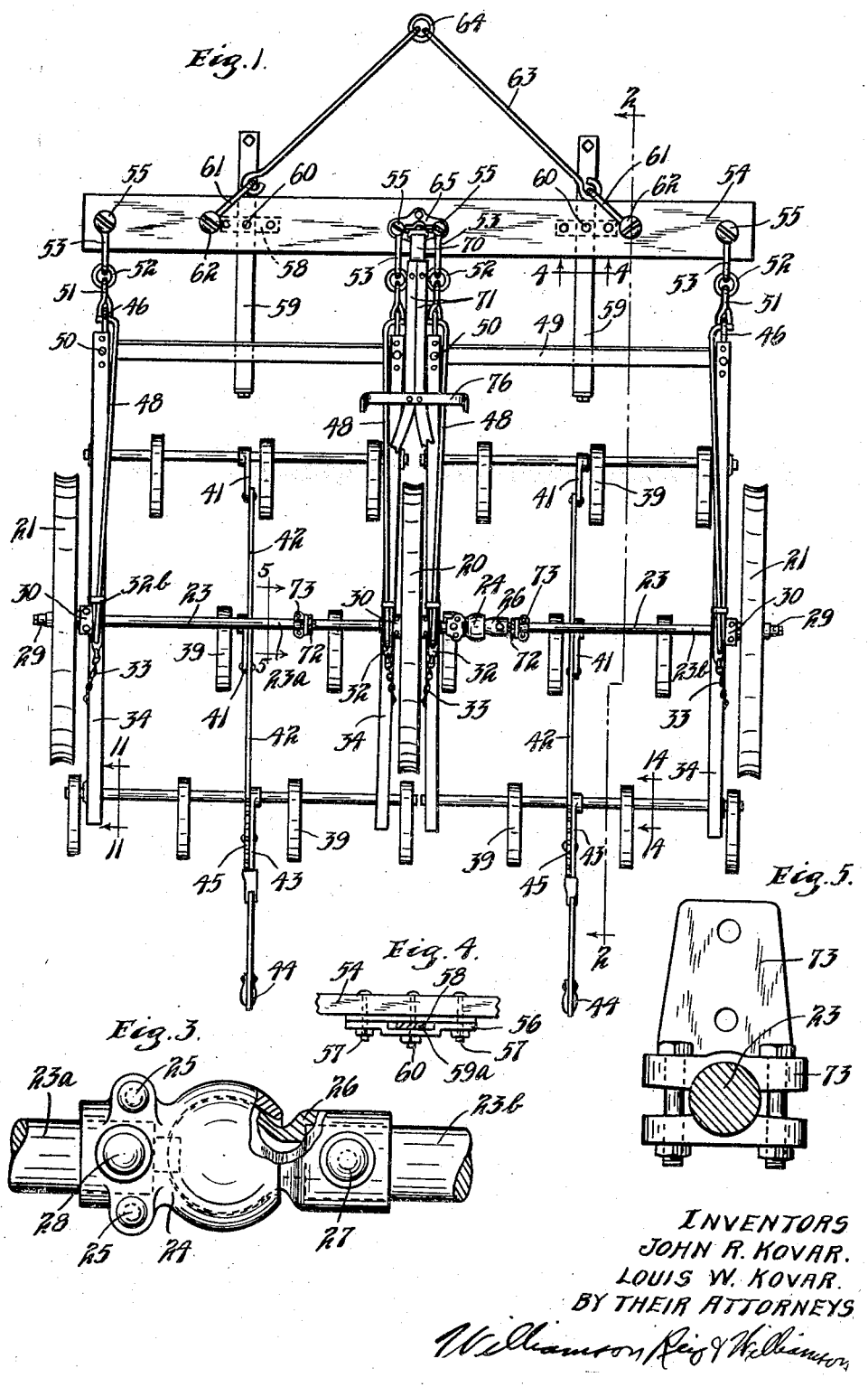

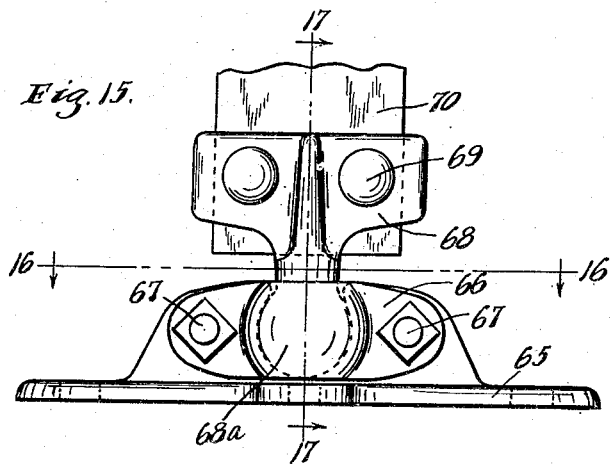
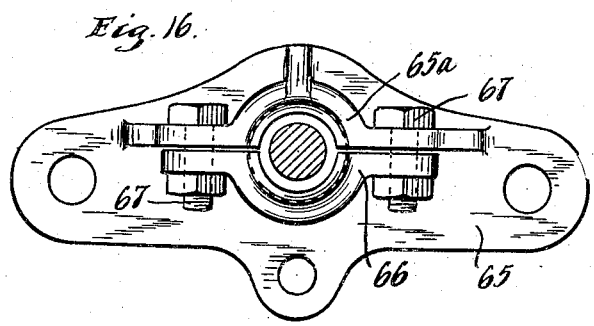
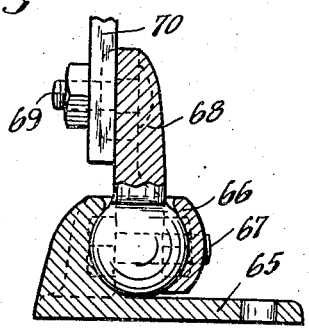
INVENTORS.
JOHN R. KOVAR.
LOUIS W. KOVAR.
BY THEIR ATTORNEYS.

Patented Sept. 22, 1931

1,824,602

UNITED STATES PATENT OFFICE

JOHN R. KOVAR AND LOUIS W. KOVAR, OF OWATONNA, MINNESOTA, ASSIGNORS TO JOSEPH J. KOVAR COMPANY, OF OWATONNA, MINNESOTA, A CORPORATION OF MINNESOTA

CULTIVATOR WITH THREE WHEELS

Application filed June 7, 1928. Serial No. 283,542.

This invention relates to an agricultural implement such as a harrow, and while many features of the invention could be used on various types of harrows or similar implements, in the embodiment of the invention illustrated the same is shown applied to a spring tooth harrow. This invention is an improvement upon the invention illustrated in our co-pending U. S. application entitled "Harrow having spring teeth", S. N. 219,424 and has several features in common with the invention disclosed in our co-pending application entitled "Cultivator structure", S. N. 316,390.

It is an object of this invention to provide a harrow having a pair of sections which are flexibly supported by three wheels, one of which runs between said sections and the others of which are respectively at the outer sides of said sections.

It is another object of the invention to provide a harrow having a plurality of tooth carrying sections having a tie bar at the forward end, to which said sections are flexibly connected, said tie bar being supported upon a pair of runners, the rear ends of said sections being supported by wheels, two of which are disposed at the outer sides of said sections respectively, wheels also being disposed between adjacent sections on a flexible axle.

It is also an object of the invention to provide a harrow having three or more wheels mounted on an axle having relatively movable sections, which axle supports a plurality of tooth carrying sections of the harrow, said sections being connected at their forward ends to a common tie bar supported by swivelling runners.

It is still another object of the invention to provide such a harrow as set forth in the preceding paragraph, the same having a seat supported on said axle, said seat being disposed over the central wheel and being braced by a member flexibly connected to said tie bar.

These and other objects and advantages of the invention will be fully set forth in the following description made in connection with the accompanying drawings, in which like reference characters refer to similar parts throughout the several views and in which:—

Fig. 1 is a plan view of the harrow;

Fig. 2 is a vertical section taken on line 2—2 of Fig. 1, as indicated by the arrows;

Fig. 3 is a partial plan of the axle coupling, shown on an enlarged scale, a portion being broken away and other portions shown in horizontal section;

Fig. 4 is a vertical section taken on line 4—4 of Fig. 1, as indicated by the arrows.

Fig. 5 is a vertical section on line 5—5 of Fig. 1, as indicated by the arrows;

Fig. 6 is a view in rear elevation of a portion of Fig. 2, showing a seat used;

Fig. 7 is a partial plan view of the device;

Fig. 8 is a vertical section taken on line 8—8 of Fig. 7, as indicated by the arrows;

Fig. 9 is a partial plan view of a connecting member on the axle, a portion being broken away and other portions being shown in horizontal section;

Fig. 10 is a vertical section taken on line 10—10 of Fig. 9, as indicated by the arrows;

Fig. 11 is a vertical section taken on line 11—11 of Fig. 1, as indicated by the arrows;

Fig. 12 is a vertical section taken on line 12—12 of Fig. 11 as indicated by the arrows;

Fig. 13 is a view in end elevation of a connecting member shown in Figs. 9 and 10;

Fig. 14 is a vertical section taken on line 14—14 of Fig. 1;

Fig. 15 is a view in front elevation of the connecting member on the tie bar;

Fig. 16 is a horizontal section taken on line 16—16 of Fig. 15, as indicated by the arrows; and Fig. 17 is a vertical section taken on line 17—17 of Fig. 15 as indicated by the arrows.

Referring to the drawings, a harrow or cultivator is shown, comprising three wheels, namely, a center wheel 20 and side wheels 21. The wheels 20 and 21 are mounted upon an axle 23 for rotation thereon, which axle has a section 23a extending through one of the wheels 21 and the center wheel 20 and another section 23b connected to section 23a by a universal joint, the latter section carrying the other wheel 21. Said universal joint comprises a pair of semi-spherical section members 24 clamped to section 23a by the headed and nutted bolts 25 and a ball member 26 enclosed in sections 24 and secured to section 23b by the headed and nutted bolt 27. A headed and nutted bolt 28 also extends through the members 24 and section 23a. The hubs 21a of wheels 21 are held on the axle by nuts 29 threaded on the ends of said axle. The hubs 21a of wheels 21 have cylindrical flanges at their ends which are embraced by semi-cylindrical members 30 having lugs at opposite sides through which extend headed and nutted bolts 31 clamping said members to the axle 23, the heads of said bolts 31 being illustrated as angular or square and seated in recesses in the top of a supporting and connecting member 32 disposed on the top member 30 and connected thereto by said bolts 31. The hub of the central wheel 20 has similar flanges at each end and similar members 32 are connected thereto by members 30. The members 32 extend forwardly and rearwardly of the machine and have their rear ends 32a upturned to form hooks. The front ends of said members are upturned to form lugs 32b having an aperture extending therethrough which, as shown in Fig. 13, is of considerable size and is illustrated as rectangular in form. Members 32 also have apertures 32c adjacent their rear portions, which apertures are shown as slightly tapered downwardly. A flexible member such as a chain 33 has one of its links shown as the end link thereof, hooked over the hook 32a and said chains extend downwardly and rearwardly and are secured at their lower ends to the side members or drag bars 34 of a pair of harrow sections, said sections thus being supported adjacent their rear ends by said chains. The flexible members or chains 33 are secured at their lower ends to bolts (not shown) extending through the vertical flanges of members 34. While the members 34 might be variously made, in the embodiment of the invention illustrated they are shown as in the form of angle bars having horizontally and vertically disposed flanges. The members 34 have secured to the vertical flanges thereof by the headed and nutted bolts 36, depending brackets 35 apertured to receive the ends of oscillating shafts 37. The aperture through bracket 35 is considerably larger than the diameter of member 37 and said member has secured thereto a saddle member 38 of crescent shape, fitting shaft 37 at one side and having spaced flanges 38a disposed at its other side, thus preventing endwise movement of shaft 37. The shafts 37 are spaced longitudinally of members 34 and have secured thereto the harrow teeth 39. These teeth as shown in Figs. 2 and 14 are of special form, the same being constructed of a comparatively narrow and fine strip of resilient material such as chrome steel, and being secured at one end as shown in Fig. 14 to the shafts 37 by headed and nutted bolts 40, the heads of which are disposed on a block 40a fitting about the end of the tooth 39 which in turn is curved to fit shaft 37. The teeth 39 extend upwardly and then rearwardly from the shaft 37 and are then curved in a longer curve forwardly, having their free ends substantially straight for a short distance, said free ends as shown in Fig. 2 being preferably of increased thickness. The forward shafts 37 have secured thereto one end of each of arms 41, the other end of which is pivotally connected to a link bar 42. Bar 42 at its rear end is pivotally connected intermediate the ends of bracket 43 having one end secured to the rear shaft 37. Lever 43 has a grip pawl member 44 thereon, adapted to engage between the various teeth of a segment 45 secured to the link bar 42. The members 34 have secured at their forward ends clevis members 46 shown as secured to the horizontal flanges thereof by the headed and nutted bolts 47. Members 46 have a plurality of holes 46a at the front end of each which end is in the form of a vertical plate, and a rod 48 has one end bent substantially at a right angle to extend through one of the holes 46a, which rod extends forwardly and rearwardly and passes through the aperture in lug 32b of member 32, said rod extending along the top of member 32 and having a downturned end passing through the aperture 32c. The rods or members 48 thus constitute draft elements flexibly connected at their forward ends with the forward ends of the harrow sections by means of the connections 46a and also flexibly connected at their rear ends with the axle through the connections 32b and 32c. Members 34 are thus also supported adjacent their forward ends by the rods 48. The members 46 have apertured laterally projecting portions 46b at the sides thereof, the apertures through which are shown as of considerable size and of rectangular shape, and angle bars 49 extend through said apertures, being connected to members 34 and 46 by headed and nutted bolts 50. The bars 49 have their vertical flanges cut away so that only the horizontal flange extends through members 46 and 34. Bars 49 thus connect the front ends of members 34 and are pivotally connected thereto. The clevis members also receive the twisted links 51 connected by the links 52 to the U-shaped clips 53 in turn pivotally connected to a tie bar 54 by the headed pins 55. The tie bar 54 is similarly connected to all of the members 34 and forms a common tie for the two harrow sections, which sections comprise the bars of members 34 connected by the rock shafts 37 and bars 49. It will be noted that, as shown in Fig. 1, the teeth 39 are so disposed on the shafts 37 that the total teeth in the machine are equally spaced and thus move in paths that are equally spaced transversely of the machine. The tie bar 54 has spaced brackets 56 secured therebeneath by the headed and nutted bolts 57, which brackets have a depressed yoke portion therein forming an opening 58 beneath said bars and the top bar 59a of a runner 59 extends through the space 58, said bar 59a being pivotally connected to the tie bar by the headed and nutted bolts 60 passing therethrough and through said bar and bracket 56. Runners 59 have the bent lower members 59b bolted to the members 59a at their forward ends and having vertical portions at their rear ends adjustably secured to downwardly bent portions of members 59a by the headed and nutted bolts 59c. The ends of members 59b project above the top surface of members 59a. U-shaped clips 61 embrace the forward portion of bar 54, being held therein by the headed pins 62, and links 63 having eyelets formed at their ends hook through the clips 61 and are connected at their other ends to the common ring 64 to which the traction means for the harrow will be secured. A bracket 65 is secured to the top of tie bar 54 centrally thereof, and has an upstanding integral flange 65a formed with a semi-spherical socket, and a separate plate 66 is secured to bracket 65, also having a semi-spherical socket therein, said member being secured by the headed and nutted bolts 67. The clevises 53 connected to the inner bars 34 are connected to tie bar 54 by the same bolts which pass through the flange of bracket 65 and secure the same to said tie bar. A ball 68a depending from a plate 68 is mounted for oscillating movement in the socket formed by members 65a and 66, which bracket 68 is secured by the headed and nutted bolts 69 to the lower end of bar 70. The bar 70 is bent at a slightly obtuse angle and is secured between and to the lower ends of a pair of angle bars 71 extending upwardly and rearwardly some distance above the axle 23. These angle bars 71 diverge some distance in front of the axle and are secured to the inner sides of the yoke member 72 formed from a strip of flat material, the ends of which are secured to brackets 73 secured to the axle at either side of the center wheel 20, said yoke 72 extending upwardly with its sides converging and passing over the top of the center wheel 20. As shown, the bars 71 extend some distance in the rear of yoke 72 and are provided with additional holes through which the securing headed and nutted bolts 74 may pass if desired. A seat 75 is bolted to the top of yoke member 72. A foot rest bar 76 is secured to the top of bar 71, having its ends upturned and directed upwardly and rearwardly as shown in Fig. 2.

From the above description it will be seen that the harrow sections comprising the pairs of bars 34 connected by the rock shafts 37 are supported from the axle by the chains 33 and by the rods 48. The harrow will be drawn along by traction means secured to the ring 64. The tie bar 54 and the front of the harrow sections will be supported by the runners 59. The depth that the teeth 39 enter the ground is determined largely by the adjustment of the levers 43 by means of which the position of the teeth is changed by rotating the rock shafts 37, all of which rotate in unison, owing to the connection of the link bars 42. It will be seen that owing to the universal joint in the axle 23, the wheels 20 and 21 can accommodate themselves to the contour of the ground and all three wheels will always be in contact with the ground. The device is quite flexible, each of the runners 59 having its top draw bar 59a laterally movable in relation to the tie bar 54. The tie bar 54 is also flexibly connected to the end of each of the side bars 34 by the links 51, rings 52 and the clevises 53. The movement of the harrow sections is therefore quite free and yet the same are evenly drawn when the machine is moving forwardly. It will be noted that the flexible connection between the bar 70 and the tie bar 54 also prevents excessive jolting of the seat 75. By providing the center wheel 20, the harrow sections are effectively supported at their adjacent sides so that the teeth at these sides will enter the ground the same distance as the teeth at the outer sides of the sections. It is obvious that more than two sections could be used and a wheel provided between adjacent sections. With a flexible axle such as described, the wheels between the sections would thus follow the contour of the ground and the teeth on all of the sections would enter the ground substantially the same distance.

From the above description it is seen that applicants have provided a simple and efficient form of harrow comprising a plurality of sections supported by three wheels. The device is simple and rugged, very flexible in structure, and can be made at comparatively small expense. The machine has been amply demonstrated in actual practice and found to be very successful and is in successful commercial use.

It will, of course, be understood that various changes may be made in the form, details, arrangement and proportions of the parts, without departing from the scope of applicants' invention, which, generally stated, consists in a device capable of carrying out the objects above set forth, in the novel parts and combinations of parts disclosed and defined in the appended claims.

What is claimed is:—

1. A harrow having in combination, a plurality of tooth carrying sections, each comprising a pair of spaced drag bars, a tie bar to which said drag bars are flexibly connected, a runner for each section pivotally connected to said tie bar for supporting said sections, a wheel disposed between adjacent sections, a wheel at the outer side of each end section, an axle for said wheels comprising flexibly connected sections, and means for supporting said sections from said axle.

2. A harrow having in combination, a pair of tooth carrying sections, a tie bar flexibly connected to said sections, means connected to said tie bar to which a traction means may be connected for drawing said harrow, a wheel disposed between said sections, a wheel at the outer side of each section, an axle extending between said wheels comprising flexibly connected sections, a seat frame extending over said first mentioned wheel having a seat secured thereto, said frame extending forwardly from said seat, and a flexible connection connecting the same to said tie bar.

3. A harrow having in combination, a pair of tooth carrying sections, a wheel disposed between said sections, a wheel at the outer side of each section, an axle extending between said wheels on which they are rotatable, said axle comprising flexibly connected sections, a member secured to said axle at the inner side of said last mentioned wheels and at either side of said first mentioned wheel, supporting members carried by said last mentioned member extending transversely of said axle, a chain extending from the rear end of each of said supporting members to said tooth carrying sections, and a rod extending from the forward end of each supporting member to said tooth carrying section.

4. A harrow having in combination, a pair of tooth carrying sections, each comprising a pair of spaced drag bars, a wheel disposed between said sections, a wheel at the outer side of each of said sections, an axle extending between said wheels on which they are rotatable, said axle comprising flexibly connected sections, a supporting member secured to said axle adjacent each of said last mentioned wheels and at either side of said first mentioned wheel and extending transversely of said axle, a chain movably secured to the rear end of said supporting member and extending downwardly and rearwardly and connected at its other end to one of said drag bars, and a rod extending from the front end of said supporting member and extending downwardly and forwardly and pivotally connected to the forward end of one of said drag bars.

5. A harrow having in combination, a pair of tooth carrying sections, each comprising a pair of spaced drag bars, a wheel disposed between said sections, a wheel at the outer side of each section, an axle extending between said wheels and comprising sections flexibly connected at one side of said first mentioned wheel, the hub of said first mentioned wheel having flanges at both ends, the hubs of said last mentioned wheels having flanges at their inner ends, members embracing said axle and also embracing said flanges on the hubs of said wheels, a supporting member secured to said last mentioned member and extending transversely of said axle, having a hook at its rear end and an upstanding apertured lug at its rear end, and also having an aperture extending vertically therethrough adjacent said hook, a chain having a link disposed over said hook and extending downwardly and rearwardly and secured to one of said drag bars, a rod extending through said apertured lug having its end bent and extending through said aperture, said rod extending downwardly and forwardly and having its end bent laterally and pivotally secured to the forward end of one of said drag bars.

6. A harrow having in combination, a pair of tooth carrying sections, each comprising a pair of spaced drag bars, a tie bar at the forward end of said harrow, means flexibly connecting said tie bar and the said drag bars, laterally swinging runners connected to said tie bar by vertical pivots and supporting the forward end of said sections, three wheels, one disposed between said sections and one at the outer side of each section, an axle extending between said wheels comprising flexibly connected sections, and means also supporting said tooth carrying sections from said axle.

7. A harrow having in combination, a pair of tooth carrying sections, each comprising a pair of spaced drag bars, rigid means connecting the forward ends of said drag bars, a plurality of spaced rock shafts extending between said drag bars having curved teeth secured thereto, means for oscillating said rock shafts to vary the position of said teeth to cause the same to enter a greater or lesser distance into the ground, a wheel between said sections, a wheel at the outer side of each section, an axle extending between said wheels, a yoke having its lower end secured at either side of said first mentioned wheel, and extending upwardly over said wheel, a seat secured at the upper end of said yoke member, a frame secured to said yoke below said seat and extending forwardly and downwardly therefrom, a tie bar flexibly connected to the forward ends of said drag bars, and a flexible means connecting said seat frame and tie bar.

8. A harrow having in combination, a plurality of tooth-carrying sections disposed side by side, a wheel disposed at the outer side of each of the end sections, a wheel disposed between adjacent sections, an axle extending transversely above said sections, all of said wheels being mounted on said axle, said axle being constructed and arranged to permit vertical movement of said latter wheel or wheels relative to said end wheels and flexible means for suspending said sections from said axle.

9. A harrow having in combination, a plurality of tooth-carrying sections disposed side by side, a wheel disposed at the outer side of each of the end sections, a wheel disposed between adjacent sections, a flexible axle on which all of said wheels are carried permitting relative vertical movement between said intermediate wheel or wheels and said end wheels, said axle being disposed some distance above said sections, flexible means for suspending said several sections from said axle, said means including forwardly and downwardly extending draft elements flexibly connected with the forward ends of said sections.

10. A harrow having in combination, a pair of tooth-carrying sections disposed side by side, a wheel between said sections, a wheel at the outer side of each section, an axle on which all of said wheels are mounted extending above said sections and comprising flexibly connected portions, a supporting member clamped to said axle adjacent each of said wheels above each side of each section and supporting means for said sections extending from said supporting members and including flexible members from which said sections are suspended and also including forwardly extending draft members flexibly connected at their forward ends with the forward ends of said sections.

11. A harrow having in combination, a plurality of tooth-carrying sections disposed side by side, a wheel disposed at the outer side of each of the end sections, a wheel disposed between adjacent sections, an axle extending above said sections and having mounted thereon all of said wheels, said axle comprising flexibly connected portions, said wheels having flanged hubs, supporting members fixed to said axle, one adjacent each of said wheels, said supporting members having means loosely engaging said wheel flanges for preventing lateral movement of said wheels and also having flexible depending connections with said tooth-carrying sections for supporting the same, said connections including draft members between the forward ends of said sections and said supporting members.

12. A harrow having in combination, a plurality of tooth-carrying sections, an axle, wheels journaled on said axle, said wheels having hubs terminating in flanges, members clamped to said axle adjacent said wheels and having portions rotatably engaging said flanges for preventing lateral movement of said wheels upon said axle.

In testimony whereof we affix our signatures.

JOHN R. KOVAR.
LOUIS W. KOVAR.